United States Patent
Szöke et al.

(10) Patent No.: US 8,500,841 B2
(45) Date of Patent: Aug. 6, 2013

(54) METHOD OF PREPARING KERATIN FERTILIZER WITH AN ADDITIVE OF HUMIC ACIDS IN COLLOID FORM AND KERATIN FERTILIZER WITH HUMIC ACIDS ADDITIVE

(76) Inventors: Štefan Szöke, Košice (SK); Róbert Vysoký, Trebišov (SK); Jaroslav Kocák, Trebišov (SK)

( * ) Notice: Subject to any disclaimer, the term of this patent is extended or adjusted under 35 U.S.C. 154(b) by 336 days.

(21) Appl. No.: 12/804,393

(22) Filed: Jul. 21, 2010

(65) Prior Publication Data

US 2011/0232345 A1    Sep. 29, 2011

(30) Foreign Application Priority Data

Mar. 29, 2010 (SK) .................................. 50010-2010

(51) Int. Cl.
- *C05D 9/02* (2006.01)
- *C05F 11/00* (2006.01)
- *C05F 1/00* (2006.01)
- *C05F 3/00* (2006.01)
- *A01N 25/00* (2006.01)

(52) U.S. Cl.
USPC .................... 71/18; 71/11; 71/15; 71/64.1

(58) Field of Classification Search
USPC ........................................ 71/11–23
See application file for complete search history.

(56) References Cited

U.S. PATENT DOCUMENTS

| 4,201,564 A * | 5/1980 | Kauzal .............................. 71/20 |
| 2011/0232345 A1 * | 9/2011 | Szoke et al. ...................... 71/18 |

FOREIGN PATENT DOCUMENTS

| HU | 205 336 | 4/1992 |
| HU | 205 739 | 6/1992 |
| WO | WO 2005/056497 | 6/2005 |

* cited by examiner

*Primary Examiner* — Kaj K Olsen
*Assistant Examiner* — Jennifer Smith
(74) *Attorney, Agent, or Firm* — Collard & Roe, P.C.

(57) ABSTRACT

A method of preparing a fertilizer by feather processing inserts a weighed feather into a reaction container, and then adds caustic potash. Water is then added, and feather disintegration occurs. Phosphoric acid is poured into the mixture, and then the pH is measured—and if necessary improved with phosphoric acid or caustic potash. Epsom salt, vitriol of iron, boric acid, manganic sulphate, zinc sulphate, cuprous sulphate, ammonium molybdate and calcium nitrate are mixed in, and the mixture is partitioned into transportation containers depending on the weight of caustic potash included in the mixture using a drain pump through appropriate filter under constant stirring. The mixture is diluted with water, and the whole mass is perfectly mixed. Humic acids are then mixed into the diluted mixture to form a final keratin fertilizer with humic acid additive in colloid form.

1 Claim, No Drawings

METHOD OF PREPARING KERATIN FERTILIZER WITH AN ADDITIVE OF HUMIC ACIDS IN COLLOID FORM AND KERATIN FERTILIZER WITH HUMIC ACIDS ADDITIVE

CROSS REFERENCE TO RELATED APPLICATIONS

Applicants claim priority under 35 U.S.C. §119 of Slovak Republic Application No. PP 50010-2010 filed Mar. 29, 2010.

BACKGROUND OF THE INVENTION

1. Field of the Invention

The invention relates to a method of preparing keratin fertilizer with an additive of humic acids in a colloid form and to keratin fertilizer with a humic acids additive.

2. The Prior Art

A fertilizer additive containing organically fixed nitrogen used for production of granulated or liquid fertilizer is described in a published patent application No PP 1539-2003 in the Slovak Republic. This additive contains a mixture of original non-adjusted cattle horns and hoofs or adjusted granular form cattle horns and hoofs with humidity up to 12% of the weight of the horns or hoofs and up to 18% of the content of the additive being organically fixed nitrogen of a protein character, while the size of granules made from cattle horns and hoofs granules varies from 0 mm to 12 mm.

The substance of a given solution is concurrently a method of production of the fertilizer additive containing organic nitrogen that is used for production of granulated or a liquid fertilizer according to which a mixture is poured into a technological container, for example into a reactor. A 100% caustic potash KOH in a mass ratio of a minimum 1:2 is added into a processed mixture and a content of a technological container is filled with 200 liters of water. The mixture can be intermixed or warmed in a lixivium bath. After the mixture is dissolved it is neutralized by the mixing in of 50 liters of 85% phosphoric acid. After the neutralization process is finished, the mixture can be enriched with other nutrients as for example with $NO_3$, Mg, Fe, Co, B, Mn, Zn, Cu etc. At the end the solvent is mixed with water $H_2O$ up to a volume not to exceed 1,000 liters.

The amount of nitrogen in soil is the most important factor from the point of view of plant nutrition even though the presence of phosphorus and sulfur has a positive effect to plant nutrition too. The Nitrogen is organically bound in a soil and therefore it loosens gradually into the soil. It changes primarily to ammoniac form $(NH_4)^+$ by the decomposition of albumin substances and by another oxidation it transforms to the nitrate form $(NO_3)$.

Fertilizers produced so far usually have a low amount of nutrients. The nitrogen is present in a nitrate form and to a less significant extent also in an ammoniac form. Amidic nitrogen functions less necrotically to a plant tissue when it is not applied directly to a root. In a combination with other nitrogen forms the amidic nitrogen allows for better exploitability of this nutritive by plants.

A method for a production of compost according to the Hungarian Patent No. 205 336A is known as well. This Patent describes a production method with a high amount of organic substances with a stimulative and alternative melioration effect with use of an additive containing keratin and swine dung. The production process itself is a separation of liquid swine dung with help of a phase separation into two parts—a solid part and a liquid part. The solid part of dung is mixed with substances including keratin, hair, or horns. The basic material, originating from this process, contains 5-50% of keratin substance. The basic material is mixed with 2-8% of hydrant lime, 5-10% of algin, 5-10% of riolit-tufa or sand stone and 10-20% of peat. Acquired mixture, taking into account its total weight, is homogenized with a mixing in of 10% of keratin additive. Such well mixed compost is then formed into pits. The humidity of a pit up to 65-80% is secured with a help of a liquid that contains 5-20% of dissolved keratin. Such a pit is interblended after an expiry time of 1-2 months.

According to a Hungarian patent No. 205 739A a basic substance for slowly degrading bio-fertilizer enriched with trace elements and with high amount of organic substances using keratin is known as well. The production process is as follows: substances containing keratin are intermixed with hydrate of lime, and then during a permanent mixing in an autoclave they undergo a process of a heat treatment under concomitant pressure change. A hot mass is filtered and filled in tanks. The mass produced is intended for bio-fertilizer and is supplemented by trace elements as needed.

These mentioned fertilizers with keratin additive are technologically demanding and are time-consuming by requiring a certain amount of time before realization and the heat treatment used increases the costs for its development.

SUMMARY OF THE INVENTION

The subject-matter of the invention according to this patent application is a method of preparation of keratin fertilizer with a humic acids additive in colloid form and a fertilizer produced by this process that is obtained by a feather processing in a poultry processing plant.

Feather delivery in a transport container approved by a veterinary authority with a valid disinfection being performed by an authorized firm has to take place before the beginning of a production process. Feathers are then batted out as appropriate and especially for this purpose are assigned a place. Feather processing starts immediately after the feather transport to the assigned place in order to avoid any possible non desired feather quality changes.

The first step consists of inserting the already weighed feathers into a reaction container. Such a container must be produced from a material resistant to concentrated alkalics and be equipped with a closing mechanism, a mixing mechanism, an intake valve, an escape valve and must be equipped with a self-exhaust mechanism through a carbon filter as well.

In the second step the caustic potash (KOH) in a ratio to the amount of weighed feathers is added into the reaction container already filled with the feathers so that a mixture is formed.

In the third step the water in a ratio to the amount of weighed feathers is mixed into the mixture under preparation in the reaction container. It is important to close up the reaction container before the water is added because the water has to be added at one bout due to the fact that the mixture under preparation heats up intensively.

The fourth step includes disintegration of the feathers in a reaction container, with the disintegration lasting for 20 hours. Over about 20 hours, the feathers are dissolved in the closed reaction container under occasional, i.e. intermittent, stirring and due to the effect of the caustic potash (KOH).

In the fifth step 85% phosphoric acid is mixed into a mixture in a ratio to the weight of the feathers in the reaction container. After the feathers are dissolved, in the fourth step, the mixture under preparation is neutralized by 85% phosphoric acid. It is possible to mix in this acid directly into the reaction container and under intensive stirring of a mass in the reaction container. A reaction connected with short-term bubbling is in progress still in this fifth step.

A pH measurement, i.e. a measurement of the acidity or alkalinity, of the mixture under preparation begins the sixth step of the process. A trial probe is taken out of a neutralized mixture and is chilled to 20° C. and its pH is measured. The pH should be in a range of 6.5±0.2. In a case when the pH is outside of this range 85% phosphoric acid or caustic potash is added to the mixture to bring the pH into the range.

The seventh step includes adding epsom salt, vitriol of iron, boric acid, manganic sulphate, zinc sulphate, cuprous sulphate, ammonium molybdate and calcium nitrate.

The eighth step includes partitioning the mixture under preparation from a reaction container into prepared transportation containers. The partitioning depends on a weight of caustic potash included in a mixture under preparation. Neutralized mixture under preparation, that is a basis of a fertilizer, is on the basis of a calculation apportioned from the reaction container into prepared transportation containers with a help of drain pump through an appropriate filter and under constant stirring of a mixture under preparation that is a basis of a fertilizer and is in the reaction container.

The ninth step includes preparation of a diluted mixture under preparation. The transportation containers are equipped with a water-proof closure mechanism with a possibility of stirring. Water is added into such a container with a mixture under preparation and the whole mass in the container is perfectly or homogenously mixed.

The tenth step includes mixing in of humic acids into the diluted mixture under preparation in the transportation container. This process causes a formation of a final keratin fertilizer with an additive of humic acids in a colloid form.

Keratin fertilizer with humic acids in colloid form contains feather, caustic potash, phosphoric acid, epsom salt, vitriol of iron, bromic acid, manganic sulphate, zinc sulphate, cuprous sulphate, ammonium molybdate, calcium nitrate, humic acids and water.

DETAILED DESCRIPTION OF PREFERRED EMBODIMENTS

Before the beginning of a production process a feather delivery from poultry processing plant has to take place in a transport container approved by a veterinary authority with a valid disinfection being performed by an authorized firm. Transported feathers are then batted out as appropriate and especially for this purpose are assigned a place. Feather processing starts immediately after the feather transport to the assigned place in order to avoid any possible non desired feather quality changes. Feathers are pressed out of water, which is done standardly in poultry processing plant and with a humidity in a range from 25% to 29%. It means that, for instance, out of 300 kg of moist feathers delivered from a poultry processing plant it is possible to obtain about 107 kg of dry feathers (300:2.8≈107), meaning that in 300 kg of moist feathers there is about 193 liters of water.

In a preparatory step, feathers are weighed to determined a weight of the feathers.

In the first step that follows the preparatory step the feathers are inserted into a reaction container. Such a container must be produced from a material resistant to concentrated alkalics and be equipped with a closing mechanism, a mixing mechanism, an intake valve, an escape valve and must be equipped with a self-exhaust mechanism through a carbon filter as well.

In the second step 15-18 weight % of caustic potash (KOH) related to the weight of the feathers is added into the reaction container already filled with the feathers so that a mixture is formed in the reaction container.

In the third step 2.5-2.9 weight % of water related to the weight of the feathers is mixed into the mixture in the reaction container. It is important to close the reaction container before the water is added because the water has to be added at one bout due to the fact that the mixture under preparation heats up intensively.

In the fourth step disintegration of the feathers occurs in the reaction container and lasts for 20 hours. In about 20 hours the feathers are dissolved in the closed reaction container under occasional or intermittent stirring and due to the effects of the caustic potash (KOH).

In the fifth step 15-18 weight % of 85% phosphoric acid $H_3PO_4$ is mixed into a mixture related to the weight of the feathers in the reaction container. After the feathers are dissolved in the fourth step the mixture under preparation is neutralized by 85% phosphoric acid. It is possible to mix in this acid directly into the reaction container and under intensive stirring of a mass in the container. A reaction connected with short-term bubbling is in progress in this step.

In the sixth step a pH measurement of the mixture under preparation is realized. A trial probe out of the neutralized mixture is taken out and chilled to 20° C., and its pH is measured. The pH should be in a range of 6.5±0.2. In case the pH is outside of this range 85% phosphoric acid or caustic potash is added to bring the pH into the range.

The seventh step includes adding 10-13 weight % of epsom salt $MgSO_4$ related to the weight of the feathers, 0.19-0.23 weight % of vitriol of iron $FeSO_4$ related to the weight of the feathers, 0.05-0.075 weight % of bromic acid $H_3BO_3$ related to the weight of the feathers, 0.03-0.055 weight % of manganic sulphate $MnSO_4$ related to the weight of the feathers, 0.008-0.02 weight % of zinc sulphate $ZnSO_4$ related to the weight of the feathers, 0.008-0.02 weight % of cuprous sulphate $CuSO_4$ related to the weight of the feathers, 0.001-0.005 weight % of ammonium molybdate $(NH_4)_6Mo_7O_{24}$ related to the weight of the feathers, and 17-22 weight % of calcium nitrate $Ca(NO_3)_2$ related to the weight of the feathers to form a modified mixture.

The eighth step includes partitioning the modified mixture from the reaction container into prepared transportation containers. The partition depends on a weight of caustic potash included in the modified mixture under preparation in that a number N of the prepared transportation containers is determined according to the formula N=KOH/50 wherein KOH is a weight of the caustic potash. Neutralized mixture under preparation, that is a basis of a fertilizer, is on the basis of a calculation apportioned from the reaction container into the prepared transportation containers with help of drain pump through an appropriate filter and under constant stirring of the modified mixture under preparation that is a basis of a fertilizer and is in the reaction container.

The ninth step includes mixture under preparation. Transportation containers are equipped with a water-proof closure mechanism with a possibility of stirring. Water is added into such a container with a mixture under preparation that is a basis of a fertilizer up to an amount of 1,000 liters of the whole mass in the container and the whole mass is perfectly or homogenously mixed.

The tenth step includes mixing in of 10-15 weight % of humic acids into the diluted mixture in the transportation container. This process causes a formation of a final keratin fertilizer with an additive of humic acids in a colloid form.

1,000 liters of a keratin fertilizer with an additive of humic acids in a colloid form thus may contain 107 kg of feather, 50 kg of caustic potash, 50 kg of phosphoric acid, 33.75 kg of epsom salt, 0.64 kg of vitriol of iron, 0.19 kg of boric acid, 0.14 kg of manganic sulphate, 0.03 kg of zinc sulphate, 0.03 kg of cuprous sulphate, 0.01 kg of ammonium molybdate, 58.98 kg of calcium nitrate, 40 kg of humic acids and a minimum of 208.1 kg water.

Although several embodiments of the present invention have been shown and described, it is to be understood that many changes and modifications may be made thereunto without departing from the spirit and scope of the invention.

The invention claimed is:

1. A method of preparation of a keratin fertilizer with humic acids in a colloid form additive, the method comprising steps of:
   in a preparatory step, weighing feathers to determine a weight of the feathers,
   then as a first step inserting the feathers into a reaction container,
   then as a second step adding into the reaction container 15-18 weight % of caustic potash (KOH) with respect to the weight of the feathers to form a mixture in the reaction container,
   then as a third step mixing into the mixture in the reaction container 2.5-2.9 weight % of water with respect to the weight of the feathers,
   then as a fourth step intermittently stirring the mixture in the reaction container such that the feathers disintegrate, the fourth step lasting for 20 hours,
   then as a fifth step mixing into the mixture in the reaction container 15-18 weight % of a 85% phosphoric acid $H_3PO_4$ with respect to the weight of the feathers to form a neutralized mixture,
   then as a sixth step performing a pH measurement of the neutralized mixture in that a trial probe of the neutralized mixture is taken out of the reaction container, is chilled to 20° C. and a pH of the trial probe is measured, and if the pH of the trial probe is not in a range of 6.5±0.2 85% phosphoric acid or caustic potash is added to the neutralized mixture until a pH of the neutralized mixture falls within the range,
   then as a seventh step adding to the neutralized mixture 10-13 weight % of epsom salt $MgSO_4$ with respect to the weight of the feathers, 0.19-0.23 weight % of vitriol of iron $FeSO_4$ with respect to the weight of the feathers, 0.05-0.075 weight % of bromic acid $H_3BO_3$ with respect to the weight of the feathers, 0.03-0.055 weight % of manganic sulphate $MnSO_4$ with respect to the weight of the feathers, 0.008-0.02 weight % of zinc sulphate $ZnSO_4$ with respect to the weight of the feathers, 0.008-0.02 weight % of cuprous sulphate $CuSO_4$ with respect to the weight of the feathers, 0.001-0.005 weight % of ammonium molybdate $(NH_4)_6Mo_7O_{24}$ with respect to the weight of the feathers, 17-22 weight % of calcium nitrate $Ca(NO_3)_2$ with respect to the weight of the feathers to form a modified mixture,
   then in an eighth step partitioning the modified mixture from the reaction container into prepared transportation containers, wherein a number N of the prepared transportation containers is determined according to a formula N=KOH/50 wherein KOH is a weight of the caustic potash, and wherein the partitioning is carried out with a help of drain pump, through a filter, and under constant stirring of the modified mixture,
   then in a ninth step diluting the modified mixture in the prepared transportation containers to form a diluted mixture and mixing the diluted mixture to be homogenous, wherein the dilution is performed via adding water to the modified mixture in an amount such that a whole mass of the diluted mixture in each prepared transportation container does not exceed 1,000 liters, and
   as a tenth step mixing in 10-15% weight percentage of humic acids with respect to the weight of the feathers into the homogenous diluted mixture in the prepared transportation containers such that the homogenous diluted mixture becomes the keratin fertilizer with the additive of humic acids in the colloid form.

* * * * *